US005988505A

United States Patent [19]

Shellhammer

[11] Patent Number: 5,988,505

[45] Date of Patent: Nov. 23, 1999

[54] OMNIDIRECTIONAL READING OF TWO-DIMENSIONAL SYMBOLS

[75] Inventor: Stephen Shellhammer, Lake Grove, N.Y.

[73] Assignee: Symbol Technologies, Inc., Holtsville, N.Y.

[21] Appl. No.: 08/868,229

[22] Filed: Jun. 3, 1997

Related U.S. Application Data

[60] Provisional application No. 60/019,006, Jun. 3, 1996.

[51] Int. Cl.[6] .......... G06K 7/10

[52] U.S. Cl. .......... 235/462.09; 235/462.25; 235/462.32; 235/462.45; 235/472.01

[58] Field of Search .......... 235/46.09, 462.1, 235/462.14, 462.24, 462.25, 462.32, 462.41, 462.42, 462.45, 470, 472.01, 454

[56] References Cited

U.S. PATENT DOCUMENTS

| | | | |
|---|---|---|---|
| 3,847,346 | 11/1974 | Dolch | 235/454 |
| 4,816,661 | 3/1989 | Krichever et al. | 235/472.01 |
| 5,126,544 | 6/1992 | Izumi | 235/454 X |
| 5,138,140 | 8/1992 | Siemiatkowski et al. | 235/470 X |
| 5,151,581 | 9/1992 | Krichever et al. | 235/470 X |
| 5,235,167 | 8/1993 | Dvorkis et al. | 235/462.09 |
| 5,243,655 | 9/1993 | Wang | 235/462.09 |
| 5,278,398 | 1/1994 | Pavlidis et al. | 235/462.09 |
| 5,304,786 | 4/1994 | Pavlidis et al. | 235/462.09 |
| 5,319,181 | 6/1994 | Shellhammer et al. | 235/462.09 |
| 5,369,265 | 11/1994 | Adachi et al. | 235/470 X |
| 5,378,881 | 1/1995 | Adachi | 235/462.09 |
| 5,414,250 | 5/1995 | Swartz et al. | 235/462.09 |
| 5,478,997 | 12/1995 | Bridgelall et al. | 235/462.09 |
| 5,486,944 | 1/1996 | Bard et al. | 359/198 |
| 5,523,552 | 6/1996 | Shellhammer et al. | 235/462.09 |
| 5,635,697 | 6/1997 | Shellhammer et al. | 235/462.09 |
| 5,637,851 | 6/1997 | Swartz et al. | 235/470 X |
| 5,665,954 | 9/1997 | Bard et al. | 235/472.01 X |
| 5,866,894 | 2/1999 | Bard et al. | 235/454 X |

*Primary Examiner*—Michael G. Lee
*Attorney, Agent, or Firm*—Gary Serbin

[57] ABSTRACT

A method and apparatus for automatically aligning a field of view of a two-dimensional bar code symbol reading device with a randomly oriented two-dimensional bar code symbol, wherein the symbol comprises a unique locatable pattern of bars and spaces, located along at least one side of the two-dimensioanl bar code. The invention uses standard omnidirectional scanning pattern for reading one-dimensional bar codes to locate the unique pattern in bar code, and works on the bar code located anywhere in the scanner field of view. The invention determines the angle of rotation of the bar code and the spatial location of the bar code in the scanner's field of view.

45 Claims, 8 Drawing Sheets

OMNIDIRECTIONAL READING OF TWO-DIMENSIONAL SYMBOLS

This application claims the benefit of U.S. Provisional Application Ser. No. 60/019,006, filed Jun. 3, 1996.

This application incorporates by reference U.S. patent application Ser. No. 08/327,531 filed Oct. 19, 1994, which issued as U.S. Pat. No. 5,523,552 on Jun. 4, 1996.

BACKGROUND OF THE INVENTION

1. Field of the Invention

This invention relates generally to the optical scanning of two-dimensional bar code symbols and in particular to the optical scanning of a randomly oriented two-dimensional bar code symbol by first determining the orientation of the symbol with respect to the field of view of the scanning device and then rotating and moving the field of view accordingly so as to be aligned substantially with the symbol for scanning, further processing and decoding.

2. Description of Related Art

Bar codes have become broadly accepted as a means for automatically identifying objects. A bar code symbol is a pattern of parallel bars and spaces of various widths that represent data elements or characters. The bars represent strings of binary ones and the spaces represent strings of binary zeros. Generally, the bars and spaces can be no smaller than a specified minimum width which is called a “module” or “unit.” The bars and spaces are multiples of this module size or minimum width.

The conventional bar code symbol is “one-dimensional” in that the bars and spaces extend only in a single direction. There has been an increasing need, however, for machine-readable symbols that contain more information than conventional bar code symbols. One approach for increasing the information in machine-readable symbols is to reduce the height of the bar codes and stack the bar codes one on top of each other to create a “stacked” or “two-dimensional” bar code. One such two-dimensional bar code is PDF 417, which was developed by Symbol Technologies, Inc. The PDF417 symbology utilizes a variable number of codewords which are discrete representations of data. A complete description of the PDF417 code is contained in U.S. Pat. No. 5,304,786, which is assigned to the same assignee as the present invention and which is incorporated by reference herein. Other two-dimensional bar code symbologies include Code 1 and Maxicode, which are referred to as matrix codes.

Both one-dimensional and two-dimensional bar code symbols are typically read by optical scanning techniques, such as scanning laser beams or CCD scanning, and the resulting electrical signals are then decoded to recover the data encoded in the symbol. In particular, two-dimensional bar code symbols such as those in the PDF417 symbology are advantageously scanned by a two-dimensional rastering laser pattern, which is comprised of a series of horizontal scans repeatedly swept in a vertical direction, as described in U.S. Pat. Nos. 4,816,661 and 5,235,167, which patents are assigned to the assignee of the present application and are incorporated by reference herein. When scanning and decoding a PDF417 bar code symbol, however, the horizontal scan lines of the laser raster must be aligned substantially with the horizontal rows of the symbol, usually within ±5° as shown in FIG. 1A. In FIG. 1A, the laser scan lines 1 form a field of view and are parallel with the horizontally located rows of PDF417 symbol 3, which will allow successful decoding (in practice, the laser scanning device generates many more closely spaced scan lines 1 than are shown in FIG. 1A, which has been simplified for purposes of clear illustration).

In FIG. 1B, however, the symbol 3*a* is tilted with respect to the scan lines 1 in the field of view such that the symbol 3*a* cannot be successfully decoded. Although a two-dimensional bar code such as PDF417 allows some deviation, the orientation of the field of view 1 must still be less than some maximum angle relative to the rows of the symbol.

When using a hand-held laser rastering scanner, the operator can physically align the raster pattern in the field of view with the two-dimensional symbol by rotating the reader and/or the object bearing the symbol until the requisite alignment of the field of view is obtained visually and the symbol is successfully read and decoded. There are many applications, however, in which it is desirable to be able to read and decode a two-dimensional bar code symbol that may be randomly oriented without having to manually move the reader such that the field of view is aligned with rows of the symbol. For example, in an industrial environment, the symbol may be located on an object moving along a conveyor belt where the reader views the symbol from above. Thus, the symbol may be in any orientation relative to the field of view of the reader. In addition, in a retail point-of-sale environment, the symbol may be located on an item presented to a cashier for purchase. The cashier typically puts the item bearing the symbol under a presentation scan lamp, which provides the appropriate laser scanning pattern. It is thus desirable in this situation to allow the cashier to quickly present the item under the scan lamp without having to align the symbol with the raster pattern.

One of the limitations of all the current PDF417 laser scanners is that the scanner must be aligned with the bar code to within about ±5°. Some scanners can produce a raster pattern rotated at any angle. It is also possible to offset that rotated raster pattern in both the x and y direction. Being able to rotate the raster pattern to any angle and ofset the pattern in x and y directions, makes it possible to read a PDF417 bar code that is not aligned with the scanner. To make such a system useful it is necessary for the scanner to automatically determine the rotation angle of the bar code as well as the horizontal and vertical offsets, and then produce a raster pattern rotated at the proper angle and offset from center correctly.

The object of the present invention is to describe a system and method for automatically determining the rotation angle as well as the vertical and horizontal offsets of a bar code located within the field of view of the scanner.

It is a further object of the present invention to provide a method and apparatus for reading and decoding a two-dimensional bar code symbol regardless of its orientation with respect to the field of view of the symbol reading device.

It is a further object of the present invention to be able to calculate the angle of skew of the misoriented bar code symbol with respect to the field of view of the reading device in order to correct for the misorientation by rotating the field of view to the calculated angle.

SUMMARY OF THE INVENTION

In accordance with these and other objects, provided is a method and apparatus for automatically aligning a field of view of a two-dimensional bar code symbol reading device with a randomly oriented two-dimensional bar code symbol, wherein the symbol comprises a unique locatable pattern of bars and spaces, located along at least one side of the two-dimensioanl bar code. This method uses standard omnidirectional scanning pattern for reading one-dimensional bar codes to locate the unique pattern in bar code, and works on the bar code located anywhere in the scanner field of view. The method determines the angle of rotation of the bar code and the location of the bar code in the scanner's field of view.

The method involves a determination of the laser beam location at any time and then recording the (x, y) coordinates when the PDF417 start or stop patterns are detected. The coordinates of the detected start and stop patterns are recorded in two lists. When enough coordinates are recorded, that data is sent to the bar code position calculator. The PDF417 bar code position calculator takes these two lists of coordinates for the detected start and stop pattern and estimates the position of the PDF417 label in the field of view. The system then adjusts its field of view for proper decoding.

DETAILED DESCRIPTION OF THE PREFERRED EMBODIMENTS

Reference will now be made in detail to the preferred embodiment of the invention, an example of which is illustrated in the accompanying drawings. The present invention is implemented advantageously in conjunction with a two-dimensional bar code symbol having a well-defined pattern that is capable of being readily located by the bar code reading device. As will be described herein, the PDF417 is one such symbology featuring such a pattern in its start and stop codewords, which border the symbol contiguously on the left and right sides, respectively. Other symbologies having at least one locatable pattern could be used according to the present invention. The preferred embodiment of the present invention is advantageously implemented in conjunction with two-dimensional bar cod e symbols encoded in the PDF417 format, which is described herein.

Code PDF417

Each PDF417 symbol is composed of a stack of rows of bar-coded information. Each row in the symbol consists of a start pattern, several codewords, and a stop pattern. A codeword is the basic unit for encoding a value representing, or associated with, certain numbers, letters, or other symbols. Collectively, the codewords in each row form data columns.

Both the number of rows and the number of data columns of the PDF417 symbol are variable. The symbol must have at least three rows and may have up to ninety rows. Likewise, within each row, the number of codewords or data columns can vary from three to thirty.

Figure 2:
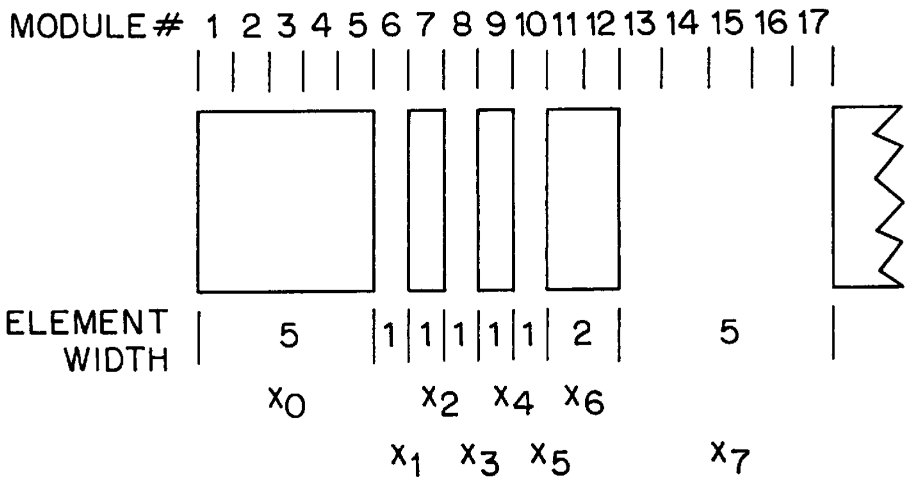
FIG. 2 is a diagram illustrating the modules and sequence of bars and spaces forming a codeword in the PDF417 format.

Each PDF417 codeword consists of seventeen modules or units. There are four bars and four spaces in each codeword. Individual bars or spaces can vary in width from one to six modules, but the combined total per codeword is always seventeen modules. Thus, each codeword can be defined by an eight-digit sequence, which represents the four sets of alternating bar and space widths within the codeword. This is called the "X-sequence" of the codeword and may be represented by the sequence X0, X1, . . . X7. For example, for an X-sequence of "51111125", the first element is five modules wide, followed by five elements one module wide, one element two modules wide, and the last element five modules wide. This example is illustrated in FIG. 2.

Given the constraints that there are seventeen modules per codeword, that there are four bars and four spaces per codeword, and that individual bars and spaces can vary from one to six modules, there are 10,480 unique codewords possible. This set of possible codewords is further partitioned into three available mutually exclusive subsets called "clusters." In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

$$\text{cluster number}=(X0-X2+X4-X6)\bmod 9$$

where "mod 9" is the remainder after division by nine. Referring to the codeword in FIG. 2, the cluster number is calculated as follows:

$$\text{cluster}=(5-1+1-2)\bmod 9=3$$

To minimize error probabilities, PDF 417 uses only three clusters, even though nine are mathematically possible. Thus, each row uses only one of the clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

$$\text{cluster number}=((\text{row number})\bmod 3)*3$$

There are 929 codeword values defined in PDF417. These values are 0 through 928. Each cluster presents the 929 available values with distinct bar-space patterns so that one cluster cannot be confused with another.

Figure 3:
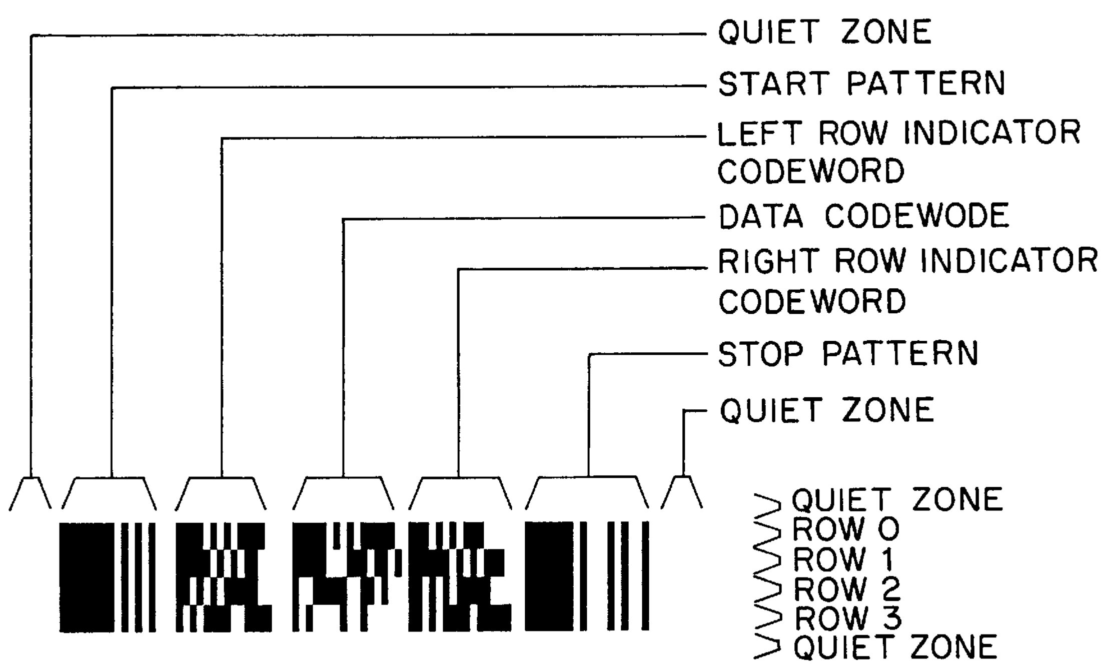
FIG. 3 is a block diagram showing the overall structure of a PDF417 symbol.

FIG. 3 is a block diagram showing the overall structure of a PDF417 symbol. Each row of the symbol consists of a start pattern, a left row indicator codeword, one or more data codewords, a right row indicator codeword, and a stop pattern. The minimum number of codewords in a row is three, including the left row indicator codeword, at least one data codeword, and the right row indicator codeword. The right and left row indicator codewords help synchronize the structure of the symbol.

The start and stop patterns identify where each row of the symbol begins and ends. Advantageously for implementation with the present invention, PDF417 uses unique start and stop patterns. The start pattern, or left side of each row, has the unique pattern, or X-sequence, of "81111113". The stop pattern, or right side of each row, has the unique X-sequence of "71131121". Since the start and stop patterns are the same for each row, these patterns form solid "structures" on the left and right sides of the symbol, respectively (as shown in FIG. 3). The entire symbol is surrounded by clear spaces or "quiet zones" which contain no dark marks.

Further details regarding the PDF417 symbology may be found in U.S. Pat. No. 5,304,786, which is incorporated by reference herein.

It is the uniqueness of the start and stop codewords and their visual contiguousness along the vertical dimension of the PDF417 symbol which facilitate the method of the present invention, as well as the position within the scanner's field of view. Thus, as will be evident, the present invention is well suited to determine the rotation and the offset for any symbology or graphic which is surrounded by a similarly unique start and/or stop pattern.

Laser Beam Tracking

In order for the scanning system to automatically determine the location of the PDF417 bar code within its field of view, it is necessary to know the location of laser beam as it crosses a unique pattern in the bar code. The present invention determines the actual (x, y) coordinates of the laser beam location at when the laser beam crosses the unique pattren.

The omnidirectional pattern used for decoding one-dimensional(1D) bar codes as shown in Fifure 4 is used in the preferred embodiment of the invention. Other patterns are possible for accomplishing the same task.

Figure 4:
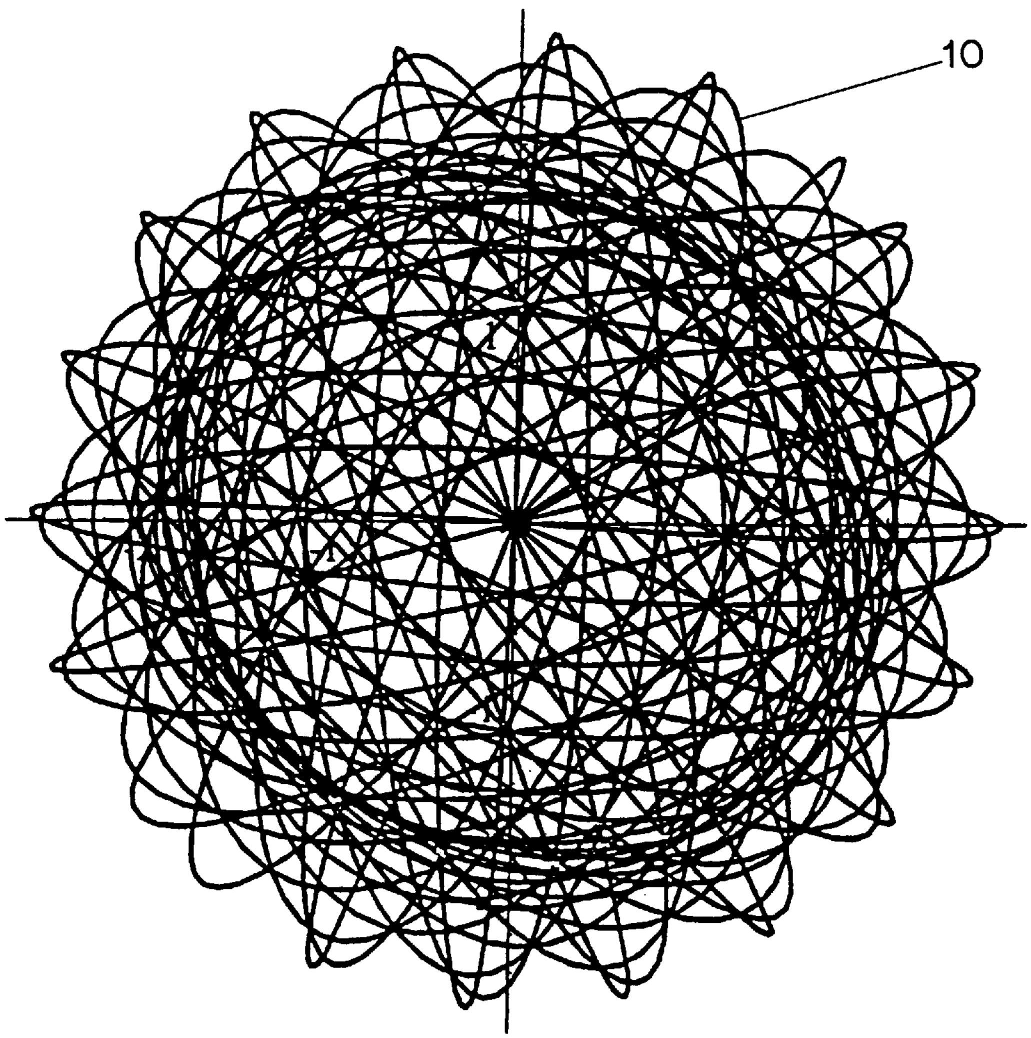
FIG. 4 is an omnidirectional one-dimensional (1D) scan pattern.

If a 1D bar code is presented to the system, the system uses the pattern of FIG. 4 to attempt to decode the bar code. When a two-dimensional bar code is presented to the system, the system uses the 1D pattern of FIG. 4, item 10, to determine the rotation angle and vertical and horizontal offsets of the bar code, and then automatically produce an appropriate scan pattern for decoding the two-dimensional bar code. This way, the system increases the ease of use and operator efficiency.

Figure 5:
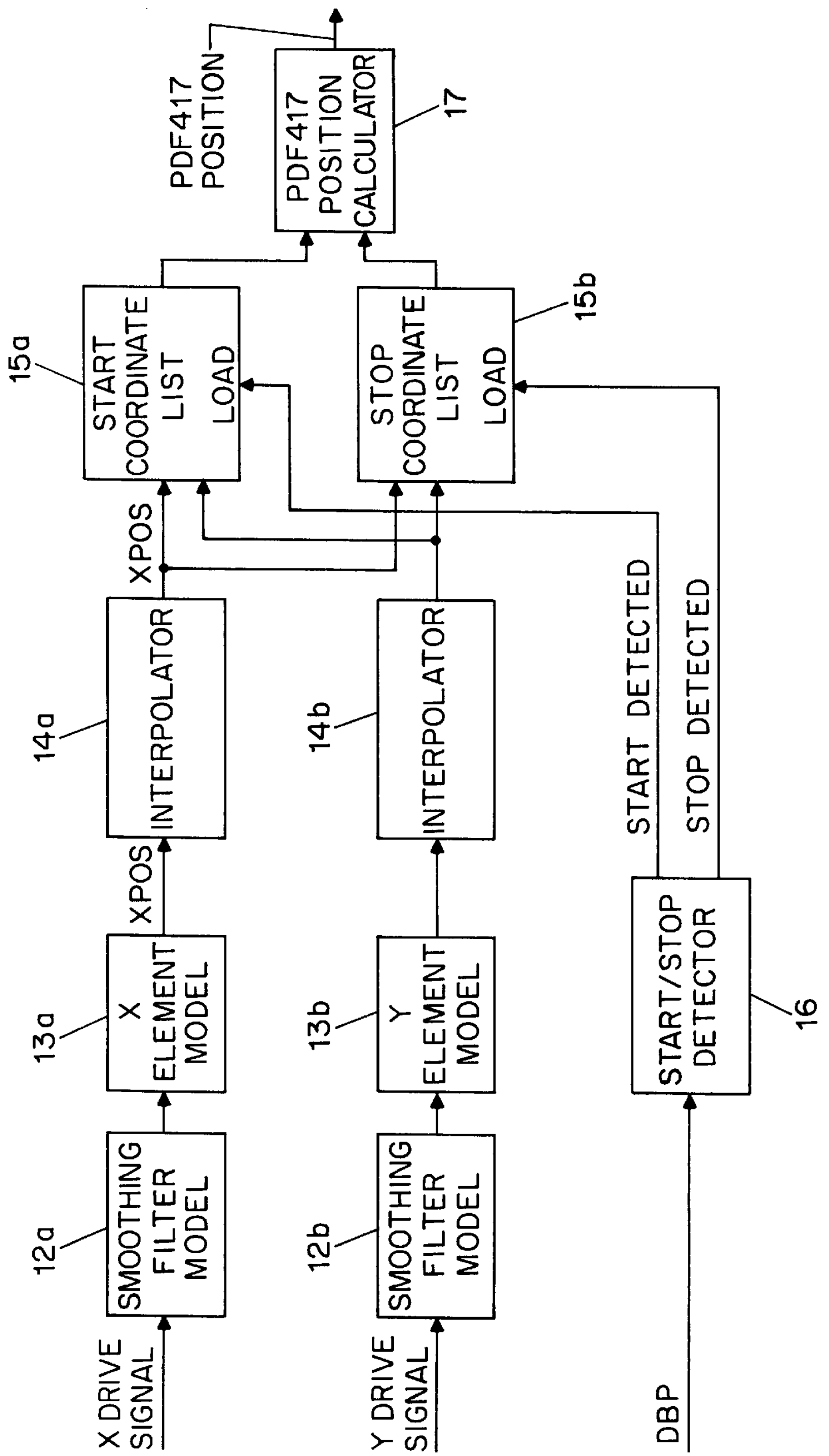
FIG. 5 is a functional block diagram of the preferred embodiment of the present invention.
Figure 10:
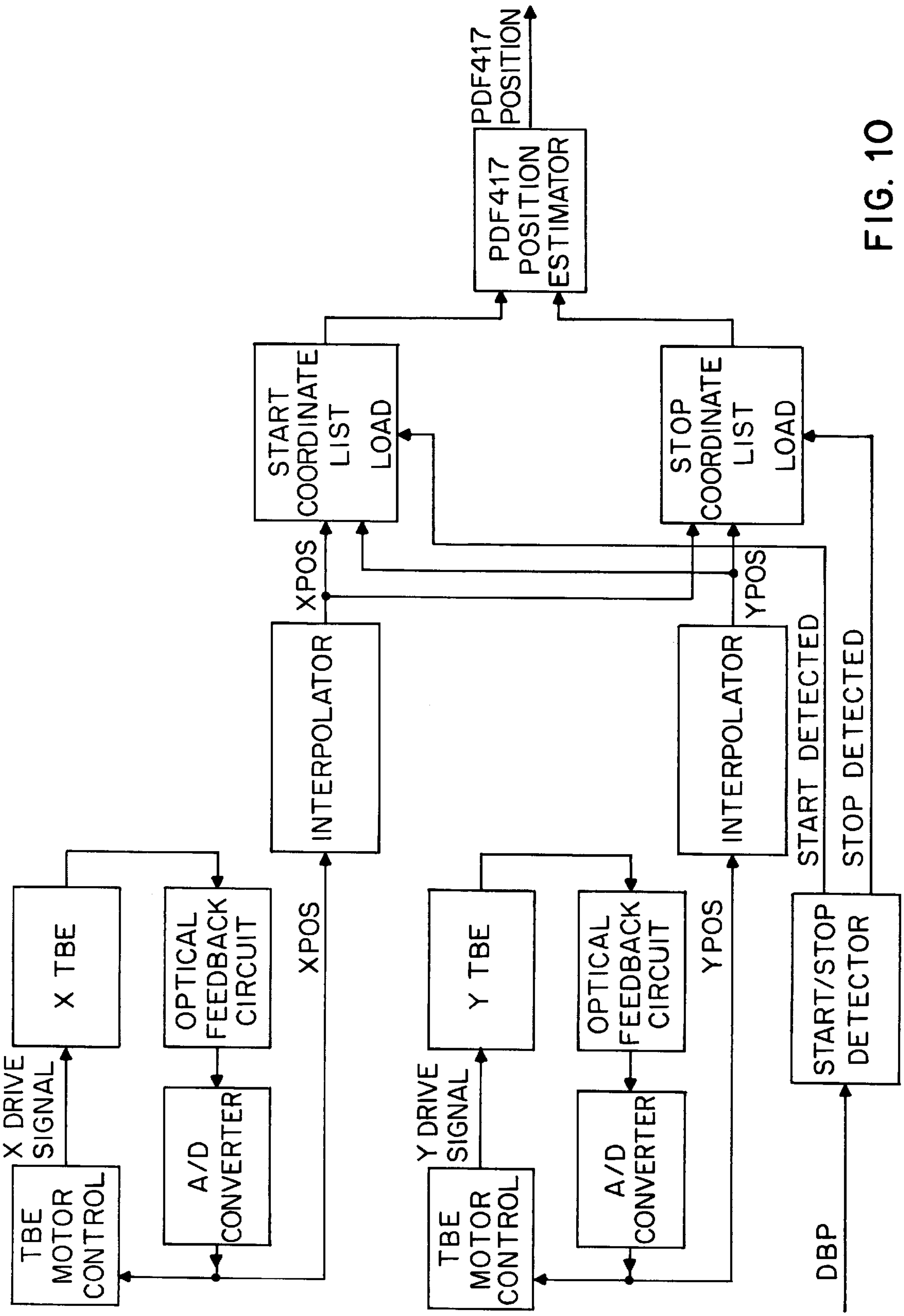
FIG. 10 shows a closed-loop observer model using an optical feedback.

The present system is based, but not limited to, an open-loop observer mode. An observer is a digital model of a physical system, or part of a system, to estimate all or some of the states of the system. If the output, or some of the states of the actual system are fed back into the observer, then it is called a standard observer, or closed-loop observer, as shown in FIG. 10. Feedback can be optical or magnetic. One such output is a velocity feedback to the observer. If however, none of the states or outputs of the actual system are fed back to the observer then the observer is an open-loop observer. In the open-loop observer mode the laser beam position is unknown, but it may be estimated by modeling the parameters of the system that produce the scanning pattern. In modeling the system parameters one must take into account the initial conditions, as well as the transient characteristics of the system. This model can be obtained when the system is being calibrated in the factory. FIG. 5 shows a block diagram of the preferred embodiment of the overall system. The model comprises an x and y Smothing filter models, represented by reference numerals 12*a* and 12*b* respectively. The outputs of each smoothing filter model goes into a drive element model, which in the preferred embodiment is a TBE element. The x and y direction TBE elements are modeled by blocks 13*a* and 13*b* respectively. The output of each TBE block goes into an Interpolator block. The x and y interpolator blocks are shown as reference numerals 14*a* and 14*b*, respectively.

The laser beam position tracker takes its inputs from the digital motor controller and then models the scanning elements, as well as the analog smoothing filters. Scanning elements modeled in the preferred embodiment are taut band elements described in U.S. Pat. No. 5,486,944 owned by the current assignee. The output of the observers are (x, y) coordinates of the laser beam position. There will be two observers: one for the element controlling the x-dimension (as well as x smoothing filter) and one for the element controlling the y-dimension (as well as the y smoothing filter).

The sampling rate used in generating the TBE drive signals in the preferred embodiment is about 8 to 16 times the highest frequency of the drive signals. If the sampling frequency is 16 times the highest drive frequency, and assuming that each scan cycle contains then there are 8 samples per scan line. The laser beam position estimate is used to determine the start and stop location. To increase the spatial resolution, one can either increase the sampling frequency or use digital interpolators to fill in values between samples. Digital interpolators are well known in the signal processing art. The use of an interpolator increases the laser beam position tracker's temporal and spatial resolutions.

The open-loop observer for the smoothing filter and the x and y elements can be implemented using digital filters, well known in the art. The smoothing filter is typically an analog, first order, low-pass filter. If the transfer function of the smoothing filter is Hsm(s) and the sampling frequency used in producing the drive signals is fs then the transfer function of the digital filter model of the smoothing filter, Hsm(z), can be obtained using the bilinear z-transform shown by Equation (1)

$$s = 2f_s * \left( \frac{1 - z^{-1}}{1 + z^{-1}} \right) \tag{1}$$

Figure 6:
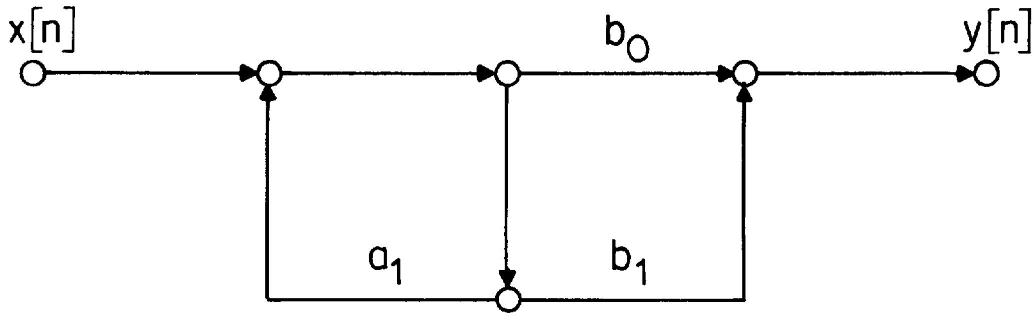
FIG. 6 is a digital filter implementation of Smoothing Filter Open-Loop observer.

If Hsm(s) is a first-order transfer function, then so is Hsm(z) and it can be implemented, in signal flow graph notation, as shown in FIG. 6. The filter coefficients are given by Hsm(z). Determination of the transfer function coefficients is well known in the art.

Figure 7:
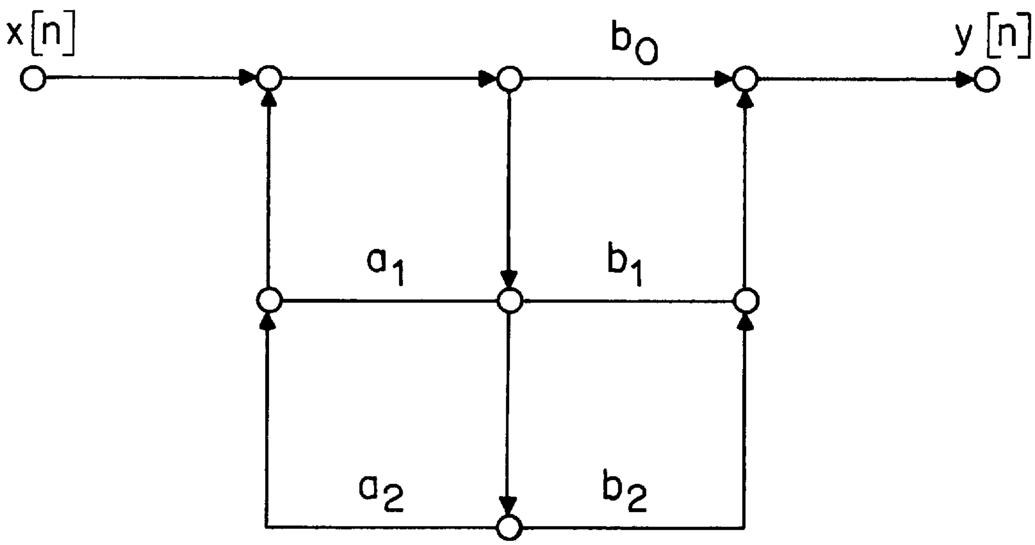
FIG. 7 is a digital filter implementation of Taut Band element (TBE) Open-Loop observer

The TBE is a mechanically resonant device that can be modeled as a second-order system, Htbe(s). The digital filter model of the TBE can be obtained once again, using the bilinear z-transform. The digital filter model of the TBE can be implemented as a second order digital filter as shown in FIG. 7. The filter coefficients are given by Htbe(z) and their determination is also well known in the art.

The digital interpolator can be implemented in numerous ways. One may need to increase the sampling frequency (e.g., by approximately 32) but the exact sampling frequency is not important as long as it is high enough as compared to the sampling rate. Because of these requirements, the preferred embodiment implements the interpolator as a cascade of interpolators where each individual interpolator increases the sampling rate by a factor of two. This leads to a computationally efficient implementation. Other interpolator implementations are possible.

While the open-loop observers for the x and y coordinates are tracking the laser beam position, the start and stop detectors, FIG. 5, item 16 are searching through the Digital Bar Pattern (DBP) trying to match the start and stop patterns. The DBP is the reconstructed bi-level signal which is produced from the received optical signal. The start and stop detectors take eight elements, four bars and four spaces at a time, and try to match them to the start and stop patterns. This can be done by decoding the eight elements and comparing them to the start and stop sequences using the standard decode algorithms well known in the art. There are other possible ways of detecting a PDF417 start and stop pattern. One could group the eight values together in a vector and compare the vector to the vector representing the PDF417 start and stop patterns. The start and stop detectors must be able to distinguish the data that comes from scanning the start and stop patterns from the data that comes from scanning the other parts of the bar code or from other graphics in the field of view. When a start or stop pattern is detected the coordinates of the laser beam at that time are recorded in an x and y coordinate lists, represented as reference numerals 15*a* and 15*b* of FIG. 5.

Once the system has produced the lists of x and y coordinates of the detected start and stop patterns, those lists are passed to the bar code position calculator, FIG. 5, item 17.

PDF417 Position Calculator

The goal of the bar code position calculator is to use the lists of detected start and stop coordinates to determine the location of the bar code label within the field of view of the scanner. The PDF417 label can be placed anywhere within the field of view of the scanner and can be rotated at any angle relative to the scanner.

Figure 8:
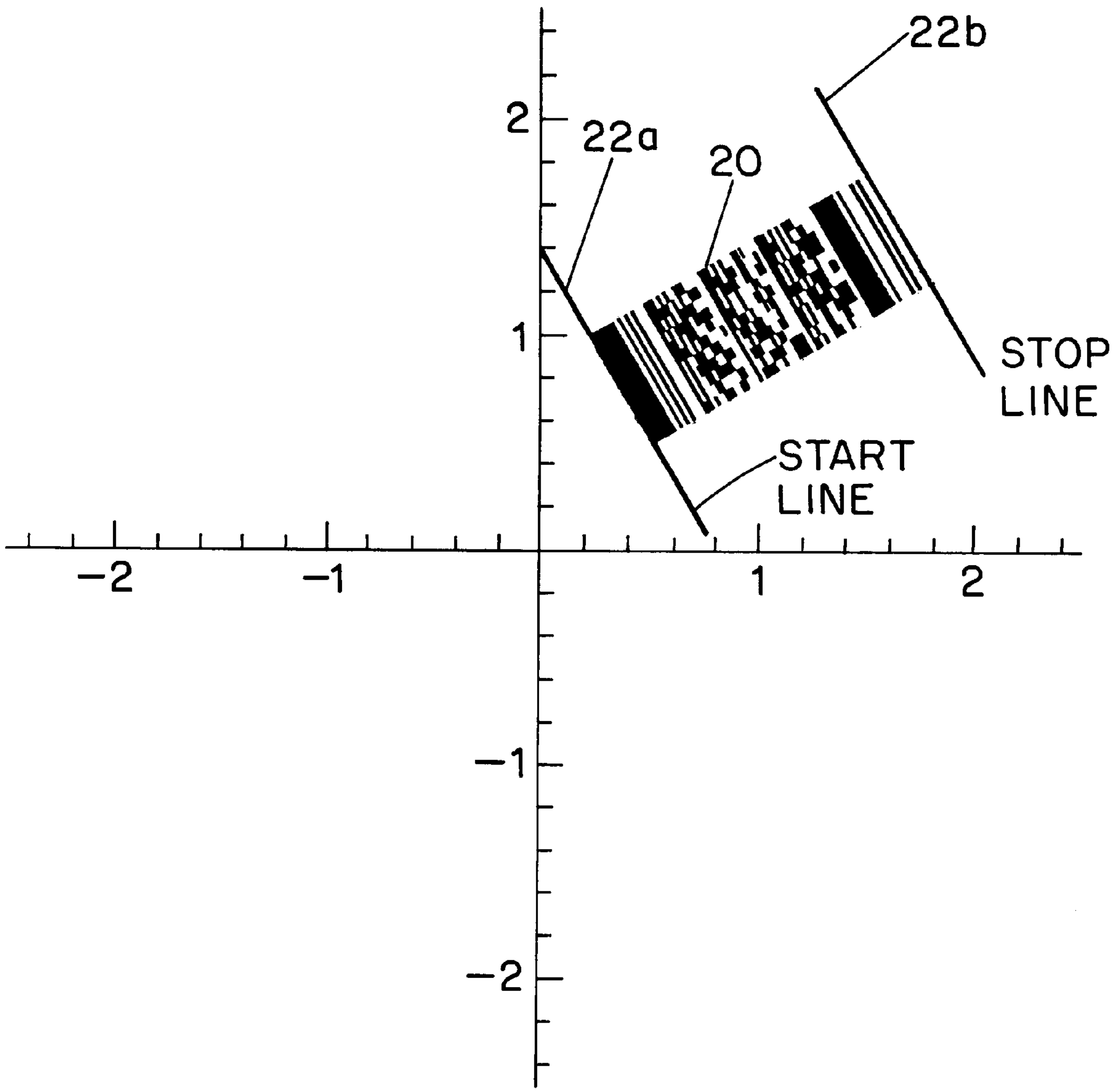
FIG. 8 is a representation of two line drawn along the Start and Stop patterns of the PDF417 label.

To calculate the position of the bar code it is necessary to parameterize the location of the bar code. This can be done by representing the bar code as two lines in space. The first line is parallel to the bars of the start pattern and runs along the edge of the bar code just touching the start pattern. The second line is similar, just touching the stop pattern. FIG. 8 illustrates the two lines running along the start, 22*a*, and stop, 22*b* patterns of the PDF417 bar code, 20. Once the parameters of those two lines have been estimated, the rotation angle as well as the vertical and horizontal offsets of the bar code can be calculated.

The parameters of the start and stop pattern lines can be estimated either separately or jointly. Estimating them separately is somewhat simpler, but estimating them jointly is more effective and requires less start and stop coordinates to obtain an accurate estimate.

Estimating the Start and Stop Positions Separately

The following describes how to estimate the parameters of a line along either the start or the stop pattern of the PDF417 bar code. Since the method is the same for both lines, it is repeated for both the start and stop lines.

One begins with a set of (x,y) coordinates that were obtained using the open-loop observer and the PDF417 start and stop detectors as described above.

$$\{(x1, y1), (x2, y2), \ldots (xn,yn)\} \tag{2}$$

The goal is to fit a straight line to this set of coordinates.

A straight line is usually represented by an equation for y as a function of x, parameterized by the slope of the line and the y-intercept.

$$y=ax+b \tag{3}$$

where 'a' is the slope and 'b' is the y-intercept. If the line is a vertical line, the slope "a" of equation 3 becomes infinite.

To avoid the case of operating with infinite numbers, the system must check to make sure the slope is not greater than a predetermined value. If the slope is greater than a predetermined value, the roles of x and y can be exchanged and x can be written in terms of y as:

$$x=ay+b \tag{4}$$

where now "a " is the inverse of the slope of the line in equation (3) and 'b' is the x-intercept.

To determine whether to use Equation 3 or Equation 4, the system can make a rough estimate of the slope of the line and then select the best parametric equation for the line. To do this, we let $$\Delta x = \left|\max_i x_i - \min_i x_i\right| \tag{5}$$

$$\Delta y = \left|\max_i y_i - \min_i y_i\right|. \tag{6}$$

The following method is described assuming Equation 3 was used.

The algorithm substitutes each of the detected coordinates of the start (stop) pattern given in Equation 2 into Equation 3 giving, $$yi=axi+b \quad i=1, 2, \ldots n. \tag{7}$$

This can be written as a linear observation equation, $$(x_i \quad 1)*\begin{pmatrix} a \\ b \end{pmatrix} = yi \quad i = 1, 2, \ldots n. \tag{8}$$

All of these n observation equations are combined into a single matrix described by Equation (9):

$$\begin{pmatrix} x_1 & 1 \\ x_2 & 1 \\ \vdots & \vdots \\ x_n & 1 \end{pmatrix}\begin{pmatrix} a \\ b \end{pmatrix} = \begin{pmatrix} y_1 \\ y_2 \\ \vdots \\ y_n \end{pmatrix} \tag{9}$$

which can be written as, $$Hsus=vs \tag{10}$$

where Hs is the observation matrix, us is the parameter vector and vs is the observation vector. Us can be determined using the least-squares estimate formula disclosed in Equation 11, below.

$$\hat{u}_s=(H_s^TH_s)^{-1}H_s^Tv_s. \tag{11}$$

This method can be applied to both the start and stop coordinates. The result is two equations for two lines with about the same slope and different y intercepts. Ideally, the slopes should be exactly the same; however, errors in the estimates may lead to slightly different slopes. The system can utilize different methods, including the averaging of the two slope values, to get an improved slope estimate.

Estimating the Start and Stop Positions Jointly

The previous section disclosed how to estimate the parameters of the lines along the start and stop patterns separately. Another way to perform the slope estimation is to model the PDF417 label by two parallel lines (i.e., having the same slope) and to jointly estimate the parameters of both lines.

The lines for the start and stop patterns can be written as, $$y=ax+b_{st}\ \text{Start Line} \tag{12}$$

$$y=ax+b_{sp}\ \text{Stop Line} \tag{13}$$

where "a" is the slope of both lines, bst is the y-intercept of the start line, and bsp is the y-intercept of the stop line.

This method uses both sets of coordinates obtained from the start and stop patterns, $$\{(x_{st1}, y_{st1}), (x_{st2}, y_{st2}), \ldots (x_{stn}, y_{stn})\} \tag{14}$$

$$\{(x_{sp1}, y_{sp1}), (x_{sp2}, y_{sp2}), \ldots (x_{spn}, y_{spn})\} \tag{15}$$

to jointly estimate all three parameters: ($a$, $b_{st}$, $b_{sp}$). The i-th start line observation equation can be written as:

$$\begin{pmatrix} x_{sti} & 1 & 0 \end{pmatrix} * \begin{pmatrix} a \\ b_{st} \\ b_{sp} \end{pmatrix} = y_{sti} \tag{16}$$

and the i-th stop line observation equation can be written as, $$\begin{pmatrix} x_{spi} & 1 & 0 \end{pmatrix} * \begin{pmatrix} a \\ b_{st} \\ b_{sp} \end{pmatrix} = y_{spi} \tag{17}$$

Combining n of these two observation equations gives the following matrix equation, $$\begin{pmatrix} x_{st1} & 1 & 0 \\ x_{sp1} & 0 & 1 \\ x_{st2} & 1 & 0 \\ x_{sp2} & 0 & 1 \\ \vdots & \vdots & \vdots \\ x_{stn} & 1 & 0 \\ x_{spn} & 0 & 1 \end{pmatrix} \begin{pmatrix} a \\ b_{st} \\ b_{sp} \end{pmatrix} = \begin{pmatrix} y_{st1} \\ y_{sp1} \\ y_{st2} \\ y_{sp2} \\ \vdots \\ y_{stn} \\ y_{spn} \end{pmatrix} \tag{18}$$

which can be written as, $$H_j u_j = v_j \tag{19}$$

where $H_j$ is the observation matrix, $u_j$ is the parameter vector, and $v_j$ is the observation vector. $U_j$ can be determined using the least-squares estimate formula disclosed in equation 20, below.

$$\hat{u}_j=(H_j^T H_j)^{-1} H_j^T v_j. \tag{20}$$

Solving this equation requires inverting $H_j^T * H_j$, which is a 3×3 symmetric matrix. There are numerous methods of efficiently solving such a 3×3 linear system well known in the art.

Figure 9:
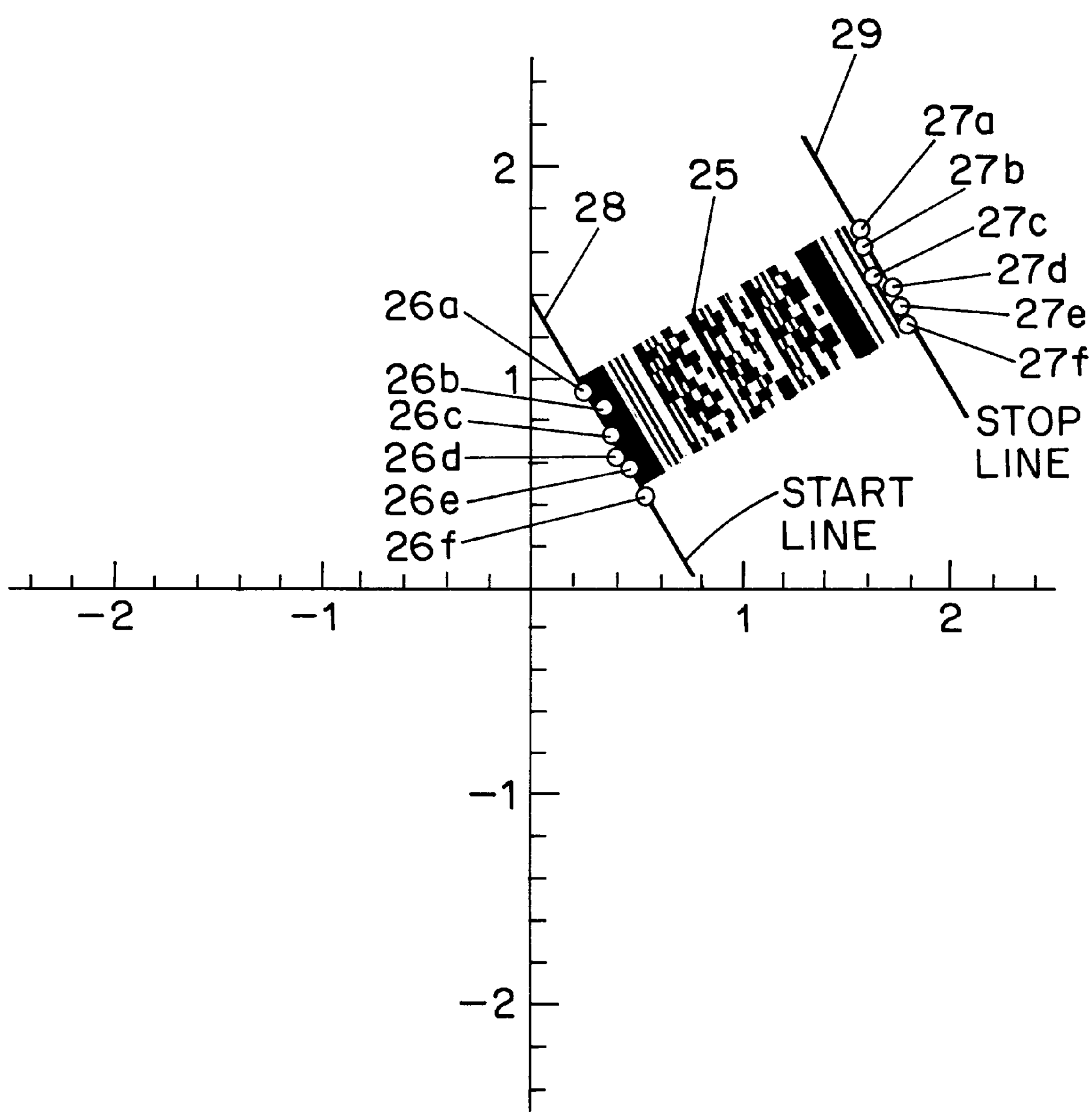
FIG. 9 shows fitting of two lines to the coordinates of the detected Start and Stop patterns.

FIG. 9 shows the PDF417 label 25, the detected start coordinates 26*a–f*, stop coordinates, 27*a–f*, and the two parallel lines that have been fitted to those coordinates 28 and 29, respectively.

Placement of Raster Pattern

Figure 1A:
FIG. 1A is an illustration of a PDF417 bar code symbol being scanned by a laser raster pattern which is aligned with the horizontal rows of the symbol.
Figure 1B:
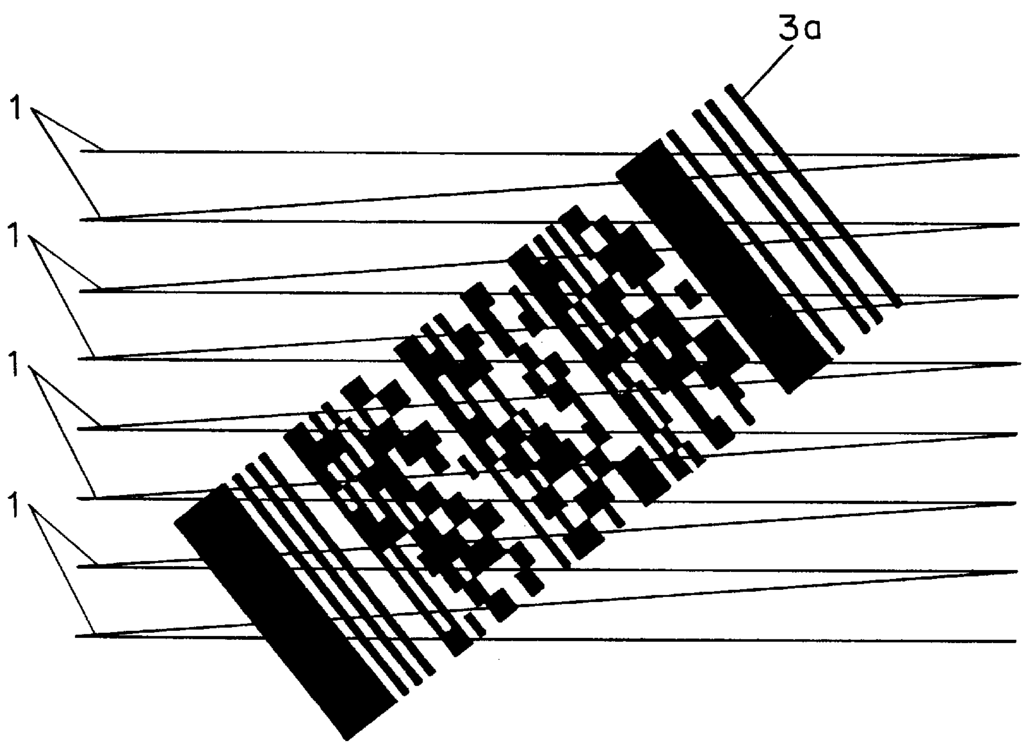
FIG. 1B is an illustration of a PDF417 label being scanned by a laser raster pattern which is tilted with respect to the horizontal rows of the symbol.

Once the equations along the start and stop patterns have been calculated, the system determines the placement of the two-dimensional scan pattern needed for decoding the two-dimensional bar code. In the case of PDF417 bar code, the two-dimensional scan pattern is a raster pattern shown in FIG. 1A.

The following assumes that the magnitude of the slope is less than one, and therefore, Equation (3) is used to determine the parameters of the lines. If that is not the case then the roles of x and y are exchanged and Equation (4) is used. Given that the parameters of Equation (13) have already been solved for, as described above, the raster pattern must be rotated by an angle $$\Theta=\arctan(a) \tag{21}$$

where "a" is the slope of the lines.

To obtain the x and y offsets one must start with the line parallel to the start and stop lines and located midway between them. This line is being described by Equation 22 as:

$$y = (a * x) + \frac{b_1 + b_2}{2} \tag{22}$$

The center of the label is located on the line of Equation 22. Equation 23 provides an x position estimate of where the label center is located.

$$x_o = \frac{\max x_i + \min x_i}{2} \tag{23}$$

wherein xi varies over all the start and stop x coordinates. Given the approximate x-offset, Equation 22 can be used to calculate the y-offset, $$y_o = (a * x_o) + \frac{b_1 + b_2}{2} \tag{24}$$

The raster pattern is to be centered on ($x_o$,$y_o$) and rotated by an angle $\Theta$ by the system's alignment mechanism.

With the use of the open-loop observers for the x and y electromechanical systems and the two-dimensional position calculator, the system determines the rotation angle and the vertical and horizontal offsets of a two-dimensional label anywhere in the scanner's field of view. Using this approach, the standard omnidirectional 1D pattern can be used simultaneously to search for the 2D label while in parallel attempting to decode 1D bar codes. The system can read either a 1D or a 2D bar code omnidirectionally.

In an alternative embodiment only one fitted line may be used to calculate the rotation of the two-dimensional bar code. In such a case the scanner may center its field of view on a point along this line, instead of locating the center of the bar code. If the unique pattern contains direction or other bar code information indicating on which side of the pattern the dada information is located, this unique pattern information can be used in estimating the spactial location of the center of the two-dimansioanl bar code.

The present invention can also be used with two-dimensional symbologies other than PDF417.

The system may be modeled by parameters other then the ones disclosed above.

Higher order equations may be used to model the open-loop observer system.

Other one dimensional patterns may be used to locate the unique sequences of the bar code.

Other methods, well known in the art, may be used to approximate the coordinates of the unique sequences scanned by a one-dimensional pattern.

Other methods, well known in the art, may be used to calculate the rotation and the offset of a one-dimensional bar code.

In another embodiment, a CCD camera may be used instead of the laser scanner.

Without further analysis, the foregoing so fully reveals the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A system for automatically aligning a field of view of a laser scanner with a two dimensional bar code symbol, having a unique sequence located contiguously along at least one side thereof, said system comprises:

a) a pattern generator for generating a plurality of scan patterns, including a locating scan pattern for determining a bar code position and a decoding scan pattern for reading the bar code symbol;

b) a laser beam position tracker for determining a spatial location of said laser beam during scanning;

c) a sequence coordinate detector for detecting a number of occurrences of the scanned unique sequence and estimating a plurality of sets of corresponding spatial coordinates based upon the tracked spatial location of the laser beam;

d) a bar code position calculator for calculating a bar code position using the plurality of sets of spatial coordinates of the detected unique sequence; and e) an alignment mechanism for aligning the decoding scan pattern with the bar code symbol based upon the calculated bar code position; whereby a unction is fitted to the estimated spatial coordinates of the detected unique sequence.

2. The system according to claim 1, wherein the locating scan pattern is an omnidirectional pattern.

3. The system according to claim 2, wherein said omnidirectional pattern is being used to read a one-dimensional bar code.

4. The system according to claim 2, wherein said laser beam position tracker operates as an open loop observer model.

5. The system according to claim 4, wherein said laser beam position tracker comprises:

a) a smoothing filter simulator for receiving a set of scan element drive signals and producing a set of smoothed drive signals;

b) a scan element simulator for receiving the smoothed drive signals and generating a set of simulated scan element orientation signals; and c) an interpolator for receiving the set of simulated scan element orientation signals and increasing the spatial resolution of the laser position tracker.

6. The system according to claim 5, wherein said scan element simulator simulates a taut band element.

7. The system according to claim 6, wherein said unique sequence further comprises a start sequence and a stop sequence, and said sequence coordinate detector detects the occurrences of said start and stop sequences.

8. The system according to claim 7, wherein the two-dimensional bar code symbol is encoded using a PDF417 encoding scheme.

9. The system according to claim 8, wherein said bar code position calculator estimates a set of line parameters along the spatial coordinates of the detected start and stop sequences.

10. The system according to claim 9, wherein the bar code position is described by a rotation angle, a "y" coordinate offset and a "x" coordinate offset, all of which are estimated using the set of line parameters.

11. The system according to claim 10, wherein the decoding scan pattern is a raster scan pattern.

12. The system according to claim 1, wherein said laser beam position tracker operates as an open loop observer model.

13. The system according to claim 12, wherein said laser beam position tracker comprises:

a) a smoothing filter simulator for receiving a set of scan element drive signals, simulating a smoothing filter and producing a set of smoothed drive signals; and b) a scan element simulator for receiving the smoothed drive signals and generating a set of simulated scan element orientation signals.

14. The system according to claim 13, further comprising an interpolator for receiving the set of simulated scan element orientation signals and increasing the spatial resolution of the laser beam position tracker.

15. The system according to claim 14, wherein the smoothing filter simulator is represented by a first order transfer function.

16. The system according to claim 15, wherein said scan element simulator simulates a taut band element.

17. The system according to claim 16, wherein said scan element simulator simulates a taut band element using a second order system function.

18. The system according to claim 1, wherein said laser beam position tracker operates as a closed loop observer model.

19. The system according to claim 18, wherein said laser beam position tracker uses a magnetic feedback to determine the spatial location of said laser beam.

20. The system according to claim 10, wherein said laser beam position tracker uses an optical feedback to determine the spatial location of said laser.

21. The system according to claim 1, wherein said scanned unique sequence is a start sequence.

22. The system according to claim 1, wherein said scanned unique sequence is a stop sequence.

23. The system according to claim 1, wherein said unique sequence further comprises a start sequence and a stop sequence, and said sequence coordinate detector detects the occurrences of said start and stop sequences.

24. The system according to claim 1, wherein the two-dimensional bar code symbol is encoded using a PDF4 17 encoding scheme.

25. The system according to claim 24, wherein the occurrence of said unique sequence is detected by decoding the elements of said sequence.

26. The system according to claim 24, wherein the occurrence of said unique sequence is detected by using a vector value comparison.

27. The system according to claim 1, wherein said bar code position calculator estimates a set of line parameters along the spatial coordinates of the detected unique sequence.

28. The system according to claim 27, wherein said bar code position calculator separately estimates a set of start line parameters and a set of stop line parameters.

29. The system according to claim 27, wherein said bar code position calculator jointly estimates a set of start line parameters and a set of stop line parameters.

30. The system according to claim 27, wherein the bar code position is described by a rotation angle, a "y" coordinate offset and a "x" coordinate offset, all of which are estimated using the set of line parameters.

31. The system according to claim 1, wherein the decoding scan pattern is a raster pattern.

32. A method for automatically aligning a field of view of a laser scanner with a randomly oriented two dimensional bar code symbol, wherein said symbol comprises a unique sequence located contiguously along at least one side thereof, said method comprising:

a) generating a scanning pattern;

b) scanning the bar code with a laser beam using the scanning pattern, c) tracking a spatial location of said laser beam during scanning;

d) detecting a number of occurrences of the scanned unique sequence;

e) estimating a plurality of sets of spatial coordinates of the detected unique sequence based upon the tracked spatial location of the laser beam; and f) calculating a bar code position using the estimated plurality of sets of spatial coordinates of the detected unique sequence; whereby a function is fitted to the estimated spatial coordinates of the detected unique sequence.

33. A method for automatically aligning a field of view of a laser scanner with a randomly oriented two dimensional bar code symbol, wherein said symbol comprises a unique sequence located contiguously along at least one side thereof, said method comprising:

a) generating a first scanning pattern;

b) scanning the bar code with a laser beam using the scanning pattern;

c) tracking a spatial location of said laser beam during scanning;

d) detecting a number of occurrences of the scanned unique sequence;

e) estimating a plurality of sets of spatial coordinates of the detected unique sequence based upon the tracked spatial location of the laser beam;

f) calculating a bar code position using the estimated plurality of sets of spatial coordinates of the detected unique sequence; and g) generating a second scanning pattern aligned with the bar code symbol based upon the calculated bar code's spatial position and angle for decoding the bar code;

whereby a function is fitted to the estimated spatial coordinates of the detected unique sequence.

34. The method according to claim 33, wherein said laser beam position tracker operates as an open loop observer model.

35. The method according to claim 34, wherein said laser beam position comprises:

a) a smoothing filter simulator for receiving a set of scan element drive signals and producing a set of smoothed drive signals;

b) a scan element simulator for receiving the smoothed drive signals and generating a set of simulated scan element orientation signals; and c) an interpolator for receiving the set of simulated scan element orientation signals and increasing the spatial resolution of the laser position tracker.

36. The method according to claim 35, wherein said scan element simulator simulates a taut band element.

37. The method according to claim 36, wherein said unique sequence further comprises a start sequence and a stop sequence, and said sequence coordinate detector detects the occurrences of said start and stop sequences.

38. The method according to claim 37, wherein the two-dimensional bar code symbol is encoded using a PDF417 encoding scheme.

39. The method according to claim 38, wherein said bar code position calculator estimates a set of line parameters along the spatial coordinates of the detected start and stop sequences.

40. The method according to claim 39, wherein the bar code position is described by a rotation angle, a "y" coordinate offset and a "x" coordinate offset, all of which are estimated using the set of line parameters.

41. The method according to claim 40, wherein the first scanning pattern is an omnidirectional scan pattern.

42. The method according to claim 41, wherein the second scanning pattern is a raster scan pattern.

43. A bar code reader for reading a two-dimensional bar code, said bar code reader comprising:

(a) a first scan pattern generator for generating a first scan pattern;

(b) a second scan pattern generator for generating a second scan pattern; and (c) a decoder for using the first scan pattern to determine the position of said two-dimensional bar code and for changing to the second scan pattern to read said two-dimensional bar code;

whereby a function is fitted to the estimated spatial coordinates of the detected unique sequence.

44. The bar code reader according to claim 43, wherein the reader is a hand-held bar code scanner.

45. The bar code reader according to claim 43, wherein the reader is a slot scanner.

* * * * *